United States Patent
Okabe et al.

(10) Patent No.: US 8,053,607 B2
(45) Date of Patent: Nov. 8, 2011

(54) METHOD FOR PRODUCING POLYETHER-POLYOL HAVING NARROW MOLECULAR WEIGHT DISTRIBUTION

(75) Inventors: Kazuaki Okabe, Kanagawa (JP); Hiroshi Nakaoka, Kanagawa (JP); Ikuhiko Kanehira, Yamaguchi (JP)

(73) Assignee: Hodogaya Chemical Co., Ltd., Kawasaki-shi (JP)

( * ) Notice: Subject to any disclaimer, the term of this patent is extended or adjusted under 35 U.S.C. 154(b) by 689 days.

(21) Appl. No.: 10/739,122

(22) Filed: Dec. 19, 2003

(65) Prior Publication Data

US 2004/0132962 A1 Jul. 8, 2004

(30) Foreign Application Priority Data

Dec. 20, 2002 (JP) ................. 2002-369386

(51) Int. Cl.
*C07C 41/38* (2006.01)
*C07C 41/34* (2006.01)
*C07C 41/01* (2006.01)
*C07C 43/00* (2006.01)
*C07C 43/10* (2006.01)

(52) U.S. Cl. ........ 568/617; 528/405; 528/408; 528/417; 528/487; 528/488; 528/494; 528/499; 568/621; 568/623; 568/624

(58) Field of Classification Search .............. 528/405, 528/408, 417, 487, 488, 494, 499; 568/617, 568/621, 623, 624
See application file for complete search history.

(56) References Cited

U.S. PATENT DOCUMENTS

| | | |
|---|---|---|
| 4,209,641 A | 6/1980 | Masuda et al. |
| 4,371,713 A | 2/1983 | Matsumoto et al. |

FOREIGN PATENT DOCUMENTS

| | | |
|---|---|---|
| JP | 57-47687 | 10/1982 |
| JP | 3352702 | 12/2002 |
| WO | WO 02/02669 | 1/2002 |

OTHER PUBLICATIONS

L. C. Case, Makromol. Chem., vol. 41, pp. 61-76, "Fractionation of Polymers Using Simple and Counter-Current Liquid-Liquid Equilibration", 1960.
P. R. Johnston, Journal of Applied Polymer Science, vol. 9, pp. 467-470, "Poly(Oxatetramethylene) Glycol. II. Molecular Weight Distribution", 1965.
Patent Abstracts of Japan; JP 60-042421, Mar. 6, 1985.

*Primary Examiner* — Rabon Sergent
(74) *Attorney, Agent, or Firm* — Oblon, Spivak, McClelland, Maier & Neustadt, L.L.P.

(57) ABSTRACT

A method for producing a polyether-polyol having a narrow molecular weight distribution, which comprises carrying out selective fractional extraction of the low-molecular weight component from a polyether-polyol (A) having an average molecular weight of from 500 to 4500 represented by formula (1):

$$HO-[(CH_2)_4O]_n-[(CR_1R_2)_pO]_q-H \qquad (1)$$

wherein $R_1$ and $R_2$, which may be the same or different, each represents a hydrogen atom or a linear or branched alkyl group having from 1 to 5 carbon atoms; n indicates a positive integer; p indicates an integer of from 1 to 8; and q indicates 0 or a positive integer, by the use of an aqueous solution (C) containing from 15 to 70 wt % sulfuric acid at a room temperature to 100° C., to thereby suitably determine the amount of the aqueous sulfuric acid solution to the overall organic layer and the sulfuric acid concentration in accordance with the molecular weight and molecular weight distribution of the intended polyether-polyol to be fractionally extracted.

17 Claims, 1 Drawing Sheet

METHOD FOR PRODUCING POLYETHER-POLYOL HAVING NARROW MOLECULAR WEIGHT DISTRIBUTION

FIELD OF THE INVENTION

The present invention relates to a method for producing polyether-polyol having a narrow molecular weight distribution by controlling a molecular weight distribution of polyether-polyol having tetrahydrofuran units which is produced through polymerization of tetrahydrofuran or copolymerization of tetrahydrofuran with any other cyclic ether. The polyether-polyol having tetrahydrofuran units exhibits good elasticity properties, low-temperature properties and hydrolysis resistance in polyurethane elastic fibers, polyurethane elastomers, polyether-polyester elastomers and polyurethane-containing elastic paints, and it is an extremely useful substance in the field of chemical industry.

BACKGROUND OF THE INVENTION

Generally, an ordinary polyether-polyol produced by cationic polymerization such as polymerization of tetrahydrofuran or copolymerization of tetrahydrofuran with any other cyclic ether has a broad molecular weight distribution. However, it is known that, when a polyether-polyol having a narrow molecular weight distribution is used for the production of polyurethane elastic fibers, polyether-ester elastomers and the like, the products may have well-balanced physical properties as compared with those from the polymer having a broad molecular weight distribution, and the products may accurately exhibit their properties in accordance with the object thereof and, in addition, there can be produced good elastomers having improved heat resistance, especially excellent dynamic physical properties such as elongation recovery and repetitive compression resistance. On the contrary, for example, polytetramethylene ether glycol obtained through polymerization of tetrahydrofuran by the use of a typical catalyst, fluorosulfonic acid, chlorosulfonic acid or acetic anhydride-perchloric acid has a broad molecular weight distribution, since the polymerization mode for it is cationic polymerization. In addition, its molecular weight distribution does not follow the rule of Gauss distribution but is biased toward the high-molecular fraction. The broad molecular weight distribution of the polymer is a long-pending question in the art. In particular, with the recent tendency toward precision industries, the request for polyether-polyol with a narrow molecular weight distribution is increasing (e.g., see JP-B 57-47687, the term "JP-B" used herein means an "examined Japanese Patent Publication").

It has heretofore been well known that a polydisperse polymer produced through an ordinary polymerization may be fractionated into a monodisperse polymer through an ordinary liquid-liquid fractionation in a combination of an oleophilic or non-polar solvent and a hydrophilic or polar solvent. The fractionation of polyoxypropylene glycol, polyoxyethylene glycol and polytetramethylene ether glycol in cyclohexane-toluene/water-methanol with varying the ratio of water-methanol therein gives polymers of almost monodispersion (e.g., see Makromol. Chem., 41, 61 (1960) and J. Appl. Poly. Sci., 9, 467 (1965)). Also, a method of fractionating tetrahydrofuran polymer or tetrahydrofuran-alkylene oxide copolymer in cycloalkane/water-methanol is disclosed (e.g., Japanese Patent 3,352,702).

However, even though polyoxytetramethylene glycol having a narrow molecular weight could be obtained in these methods in which some organic solvents are used in combination thereof, there are still problems in that much energy is needed for solvent recovery and solvent separation may be often difficult. Still another but more serious problem is that the residual fraction that remains after the fractional extraction of the intended product having a narrow molecular weight distribution must be subjected to post treatment. Anyhow, these methods have the industrial disadvantages as above.

SUMMARY OF THE INVENTION

An object of the present invention is to provide a method for producing polyether-polyol having a narrow molecular weight distribution by controlling the molecular weight distribution of polyether-polyol. More precisely, it provides a method for producing polyether-polyol having a narrow molecular weight distribution by controlling the molecular weight distribution of a polyether-polyol containing tetrahydrofuran units which is produced through polymerization of tetrahydrofuran or copolymerization of tetrahydrofuran with any other cyclic ether, in particular to a industrially advantageous method for producing polyether-polyol having a narrow molecular weight distribution by narrowing the molecular weight distribution of the polymer.

As a result of extensive investigation, the present inventors have found an industrially advantageous method for producing polyether-polyol having a narrow molecular weight distribution by controlling the molecular weight distribution of a polyether-polyol containing tetrahydrofuran units which is produced through polymerization of tetrahydrofuran or copolymerization of tetrahydrofuran with any other cyclic ether, especially a method for producing polyether-polyol having a narrow molecular weight distribution by narrowing the molecular weight distribution of the polymer. The present, invention has been completed based on this finding.

That is, the present invention provides a method for producing a polyether-polyol having a narrow molecular weight distribution, which comprises carrying out selective fractional extraction of the low-molecular weight component from a polyether-polyol (A) having an average molecular weight of from 500 to 4500 represented by formula (1):

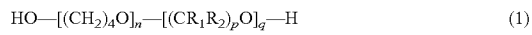

$$\text{HO}-[(CH_2)_4O]_n-[(CR_1R_2)_pO]_q-H \tag{1}$$

wherein $R_1$ and $R_2$, which may be the same or different, each represents a hydrogen atom or a linear or branched alkyl group having from 1 to 5 carbon atoms; n indicates a positive integer; p indicates an integer of from 1 to 8; and q indicates 0 or a positive integer, by suitably determining the amount of the aqueous sulfuric acid solution to the overall organic layer and the sulfuric acid concentration in accordance with the molecular weight and molecular weight distribution of the desired polyether-polyol by the use of an aqueous solution (C) containing from 15 to 70 wt % sulfuric acid at a room temperature to 100° C.

Further, the present invention relates to the following embodiments:

The above-mentioned method for producing a polyether-polyol having a narrow molecular weight distribution, wherein the selective fractional extraction is carried out in the presence of a fractional extraction solvent (B) which dissolves the polyether-polyol (A).

The above-mentioned method for producing a polyether-polyol having a narrow molecular weight distribution, wherein the fractional extraction solvent (B) is tetrahydrofuran or alkyl-substituted tetrahydrofuran or a mixture thereof.

The above-mentioned method for producing a polyether-polyol having a narrow molecular weight distribution, wherein the amount of the fractional extraction solvent (B) is 0.2 to 4.0 wt % based on the polyether-polyol (A).

The above-mentioned method for producing a polyether-polyol having a narrow molecular weight distribution, wherein the sulfuric acid concentration of the sulfuric acid-containing aqueous solution is from 20 to 60 wt %.

The above-mentioned method for producing a polyether-polyol having a narrow molecular weight distribution, wherein the fractional extraction temperature is from a room temperature to a boiling point of the fractional extraction solvent (B).

The above-mentioned method for producing a polyether-polyol having a narrow molecular weight distribution, wherein the fractional extraction temperature is a boiling point of the fractional extraction solvent (B).

The above-mentioned method for producing a polyether-polyol having a narrow molecular weight distribution, wherein the fractional extraction treatment is carried out by the use of the unreacted monomer of tetrahydrofuran or alkyl-substituted tetrahydrofuran still remaining in the reaction mixture after polymerization or copolymerization, directly for the fractional extraction solvent.

The above-mentioned method for producing a polyether-polyol having a narrow molecular weight distribution, wherein sulfuric acid that is formed from a sulfuric acid-based catalyst of, a cationic polymerization catalyst, through degradation thereof with water added for polymerization termination is directly used for the sulfuric acid-containing aqueous solution for the fractional extraction treatment.

The above-mentioned method for producing polyether-polyol having a narrow molecular weight distribution, the sulfuric acid-based catalyst of a cationic polymerization catalyst is one or more selected from fluorosulfonic acid, chlorosulfonic acid and fuming sulfuric acid.

The above-mentioned method for producing a polyether-polyol having a narrow molecular weight distribution, wherein the fractional extraction treatment is carried out in a reaction tank used for the synthesis of the polyester-polyol (A) or a separatory tank used for the recovery of the aqueous sulfuric acid solution after the reaction.

The above-mentioned method for producing polyether-polyol having a narrow molecular weight distribution, which further adding water and/or an alkali substance to an aqueous sulfuric acid solution (D) containing a low-molecular weight component of the polyether-polyol obtained after the selective fractional extraction of the low-molecular weight component by the use of an aqueous solution (C) containing sulfuric acid to thereby reduce the sulfuric acid concentration of the aqueous sulfuric acid solution (D) containing a low-molecular weight component, carrying out selective fractional extraction of the low-molecular weight component in the aqueous sulfuric acid solution (D) at a room temperature to 100° C. to recover a polyether-polyol, wherein the amount of the water and/or alkali substance added to an aqueous sulfuric acid solution (D) is suitably determined in accordance with the molecular weight and molecular weight distribution of the intended polyether-polyol to be fractionally extracted.

The above-mentioned method for producing a polyether-polyol having a narrow molecular weight distribution, wherein the recovery treatment is carried out in the presence of a fractional extraction solvent (B) which dissolves the polyether-polyol.

The above-mentioned method for producing a polyether-polyol having a narrow molecular weight distribution, wherein the fractional extraction solvent (B) is tetrahydrofuran or alkyl-substituted tetrahydrofuran or a mixture thereof.

The above-mentioned method for producing a polyether-polyol having a narrow molecular weight distribution, which includes a step of heating and distilling the sulfuric acid-containing aqueous layer after the fractional extraction treatment to thereby make the low-molecular weight fraction existing in the sulfuric acid-containing aqueous layer depolymerized into monomer by an acid, and evaporating and recovering the resulting monomer along with the unreacted monomer dissolved in the sulfuric acid-containing aqueous layer.

The low-molecular weight fraction dissolved in the sulfuric acid-containing aqueous layer can be obtained as a low-molecular weight polyether-polyol by adding further water and/or alkali substance to the sulfuric acid-containing aqueous layer and repeatedly carrying out the fractional extraction operation, followed by recovering and purifying it.

DETAILED DESCRIPTION OF THE INVENTION

Figure 1:
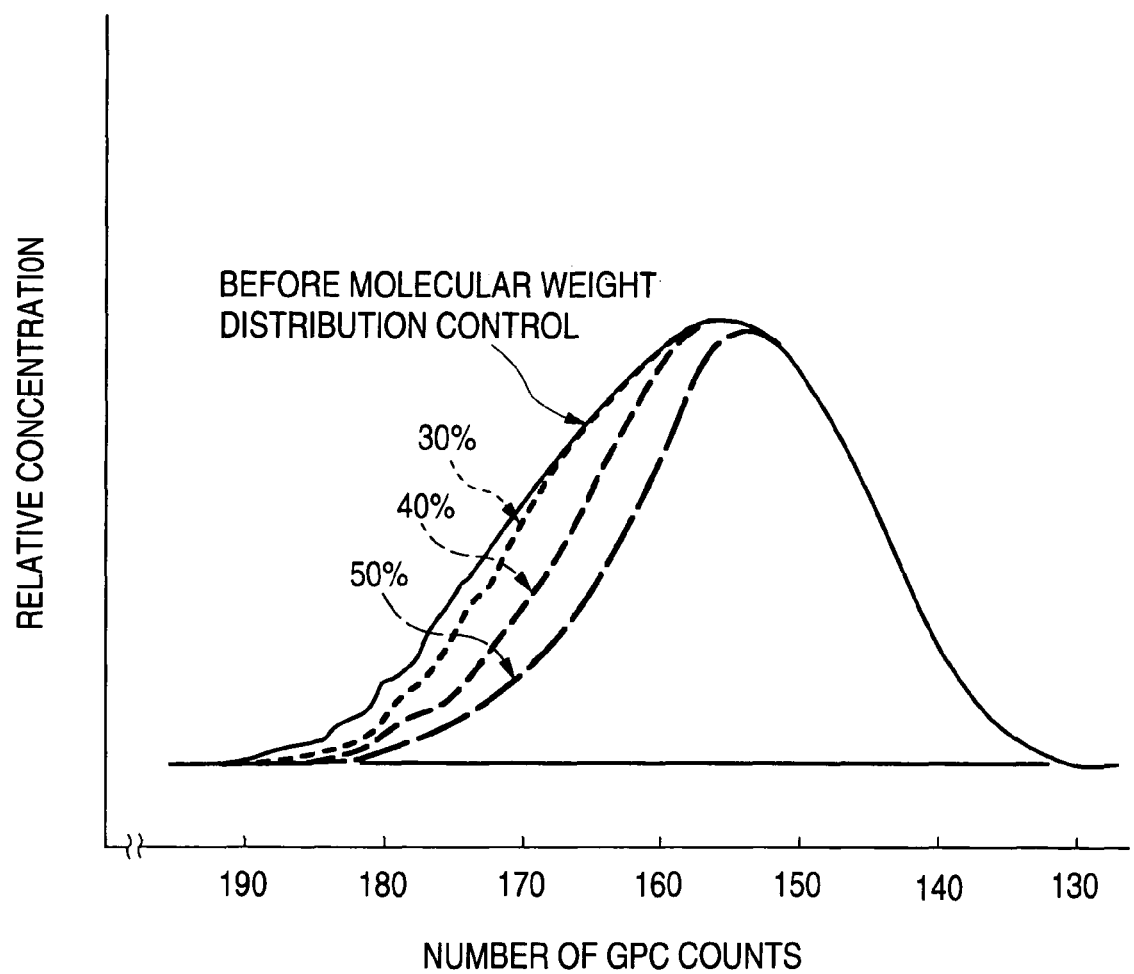
FIG. 1 shows GPC curves of each polytetramethylene ether glycol obtained in Examples 1 to 3 by means of GPC analysis, in which the vertical axis indicates the relative concentration of the polymer. The full line is the molecular weight distribution curve of the starting polytetramethylene ether glycol used in the Examples, i.e., the polymer before molecular weight distribution control, and the dotted lines are the molecular weight distribution curves of polytetramethylene ether glycol obtained in Examples 1 to 3.

The polyether-polyol to be processed according to the method of the invention may be a pure or crude product, having an industrially useful average molecular weight of from 500 to 4500. The fractionation solvent is a solvent for solving the polyether-polyol, preferably tetrahydrofuran, alkyl-substituted tetrahydrofuran or their mixture. The amount of the fractionation solvent used in the present invention is preferably from about 0.2 to 4.0 in terms of the ratio by weight to the polyether-polyol, but as mentioned hereinabove, the unreacted monomer may be used directly for the solvent.

The tetrahydrofuran or alkyl-substituted tetrahydrofuran used as a solvent in the method of the present invention is a monomer for the intended polyether-polyol product in the present invention, and therefore the unreacted monomer after the polymerization to give the polymer may be used directly for the fractionation solvent, and after the intended fractionation operation, it may be recovered and purified, and then may be used again for the monomer. On the other hand, the sulfuric acid-containing aqueous layer used for the extraction contains the extracted low-molecular fraction and the unreacted monomer, and when this is heated and distilled, then the polyether-polyol dissolved therein may be depolymerized by the acid and the resulting monomer may be recovered along with the dissolved monomer. The recovered monomer may be purified and may be used again. The remaining, sulfuric acid-containing aqueous layer may be used again as the next fractionation solvent.

The sulfuric acid concentration of the sulfuric acid-containing aqueous solution used for the fractional extraction in the method of the present invention is from 15 to 70 wt %, but preferably from 20 to 60 wt %. If the sulfuric acid concentration is 15 wt % or less, the extraction ratio of the low-molecular fraction is low; but if it is 70 wt % or more, then polyether-polyol, tetrahydrofuran or alkyl-substituted tetrahydrofuran and aqueous sulfuric acid solution mutually dissolve and the fractional extraction is difficult. Within the sulfuric acid concentration of from 15 to 70 wt %, the higher sulfuric acid concentration increases the low-molecular fraction extraction ratio. Accordingly, the intended polyether-polyol having a narrow molecular weight distribution can be obtained, and when the sulfuric acid concentration is varied within the defined range, then the polyether-polyol having a desired molecular weight distribution in accordance with the object thereof can be obtained in any desired manner.

The amount of the aqueous sulfuric acid solution to the overall organic layer may be suitably determined in accordance with the sulfuric acid concentration and the molecular weight and molecular weight distribution of the intended polyether-polyol to be fractionally extracted. Regarding the aqueous sulfuric acid solution, when the method of the present invention is applied to polyether-polyol or its product obtained by the use of a cationic polymerization catalyst not containing sulfuric acid, then a separately prepared, aqueous sulfuric acid solution is used and circulated, but when it is applied to polyether-polyol obtained by the use of a typical sulfuric acid-based cationic polymerization catalyst such as fluorosulfonic acid, chlorosulfonic acid or fuming sulfuric acid, or other sulfuric acid-based catalyst that consists essentially of any of these, then sulfuric acid that is derived from the catalyst through degradation thereof with water added after polymerization termination may be used directly as it is. Accordingly, the fractional extraction operation may be carried out in a reaction tank of the polyether-polyol or a separatory tank for the recovery of the aqueous sulfuric acid solution after the reaction.

The fractional extraction in the method of the present invention is effected by stirring the system at a predetermined temperature until the overall organic layer and the aqueous sulfuric acid layer can entirely reach the fractionation equilibrium, and then statically leaving it for liquid-liquid separation. The temperature may be from a room temperature to 100° C., preferably from a room temperature to around the boiling point of a fractional extraction solvent such as tetrahydrofuran, alkyl-substituted tetrahydrofuran or their mixture, more preferably around the boiling point thereof for shortening the time for static liquid-liquid separation.

The molecular weight distribution is defined as a ratio of "weight-average molecular weight" to "number-average molecular weight", but it is known that the approximate value of the molecular weight distribution of the polyether-polyol may be obtained from the measured data of the bulk viscosity and the number-average molecular weight of the polymer (see JP-B-57-47687, the text of which is incorporated herein by reference). That is, the bulk viscosity can be measured according to a known method, and the number-average molecular weight can be obtained from the hydroxyl value (mg KOH/g) of the polymer measured in a known method. The approximate molecular weight distribution can be obtained from a ratio of "viscosity-average molecular weight" to "number-average molecular weight". The viscosity-average molecular weight (Mvis) is calculated according to the following equation that relates to the bulk viscosity (poise) measured at 40° C.

$$Mvis = \text{anti-log}(0.493 \log\text{-viscosity} + 3.0646).$$

This shows that the polymer having a larger ratio of viscosity-average molecular weight (Mvis) to number-average molecular weight (Mn) has a broader molecular weight distribution.

The present invention will now be illustrated in greater detail with reference to the Examples in view of the Comparative Examples, but the present invention should not be construed as being limited thereto. All of the "parts" and "percent" are given by weight unless otherwise indicated.

Reference Example

Ordinary commercial polytetramethylene ether glycol (PTMG) were analyzed to determine their bulk viscosity and number-average molecular weight, and the molecular weight distribution of the polymer was calculated from the measured data. The results are shown in Table 1 below. The calculated value of molecular weight distribution of the polymer was almost near to 2.0, the molecular weight distribution value of polytetramethylene ether glycol theoretically estimated from cationic polymerization of tetrahydrofuran. This confirms that the molecular weight distribution of the polymer analyzed is broad.

TABLE 1

| PTMG Manufacturer | Hydroxyl Value (mg KOH/g) | Number-Average Molecular Weight (Mn) | Viscosity at 40° C. (poise) | Molecular Weight Distribution (Mvis/Mn) |
| --- | --- | --- | --- | --- |
| (a) | 117.9 | 952 | 2.89 | 2.06 |
|  | 55.0 | 2040 | 14.46 | 2.05 |
| (b) | 109.5 | 1025 | 3.17 | 2.00 |
|  | 55.7 | 2014 | 12.42 | 1.99 |

Examples 1 to 3

100 parts of a sample, polytetramethylene ether glycol obtained in a known method with a fluorosulfonic acid catalyst [hydroxyl value=119.4 mgKOH/g; number-average molecular weight=940; bulk viscosity=2.82 poises (40° C.); molecular weight distribution (Mvis/Mn)=2.06], 100 parts of tetrahydrofuran and 100 parts of aqueous 30% sulfuric acid solution were put into a 500-cc four-neck flask (equipped with a thermometer and a stirrer) with each mouth being stopped with a separating cock, and stirred and mixed at 70° C. for 30 minutes, and then statically separated into two layers. The lower layer, aqueous sulfuric acid layer was removed through liquid-liquid separation. The upper organic layer was neutralized with calcium hydroxide and tetrahydrofuran was evaporated away. 100 parts of toluene was added thereto and subjected to azeotropic dehydration. This was filtered with a filtration aid, and toluene was evaporated away under reduced pressure from the filtrate to obtain the intended polytetramethylene ether glycol.

Next, the concentration of the aqueous sulfuric acid solution was changed to 40% (Example 2) and to 50% (Example 3), and the sample was processed in the same manner as above to obtain the fractionated polytetramethylene ether glycol. The yield, the hydroxyl value, the number-average molecular weight and the molecular weight distribution of each sample are shown in Table 2 below. The GPC (gel permeation chromatography) curve (columns, TSK G-2500H, XG-4000H; tetrahydrofuran solvent, 40° C.) of the polytetramethylene ether glycol obtained in each Example is shown in FIG. 1.

Example 4

125 parts of a sample, polytetramethylene ether glycol obtained in a known method with an acetic anhydride-perchloric acid (HClO$_4$) catalyst [hydroxyl value=66.0 mg KOH/g; number-average molecular weight=1700; bulk viscosity=10.57 poises (40° C.); molecular weight distribution (Mvis/Mn)=2.13], 100 parts of tetrahydrofuran and 125 parts of aqueous 30% sulfuric acid solution were stirred and mixed at 70° C. for 30 minutes and subjected to extraction operation. This was then processed in the same manner as in Example 1. The results of the product obtained herein are given in Table 2 below.

TABLE 2

| Example | Production of Sample PTMG | Sulfuric Acid Concentration for Fractional Extraction | Yield (%) | OH Value (mg KOH/g) | PTMG Average molecular weight | 40° C. Bulk Viscosity (poise) | Molecular Weight Distribution (Mvis/Mn) |
|---|---|---|---|---|---|---|---|
| Sample Example 1 | Fluorosulfonic Acid Process | — | 100 | 119.4 | 940 | 2.82 | 2.06 |
| Example 1 | | 30 | 95.7 | 108.2 | 1037 | 2.90 | 1.89 |
| Example 2 | | 40 | 82.5 | 97.0 | 1157 | 3.23 | 1.79 |
| Example 3 | | 50 | 69.9 | 84.4 | 1329 | 3.70 | 1.66 |
| Sample Example 4 | Acetic Anhydride-Perchloric Acid Process | — | 100 | 66.0 | 1700 | 10.57 | 2.13 |
| | | 30 | 93.6 | 55.0 | 2040 | 10.58 | 1.82 |

Examples 5 to 7 and Comparative Example 1

400 parts of tetrahydrofuran was put into a one-liter four-neck flask (equipped with a thermometer and a stirrer), and 4.0 parts of antimony pentachloride ($SbCl_5$) was added thereto with cooling at 0° C. Then, 80 parts of 30% fuming sulfuric acid was added thereto over a period of 2 hours, and the monomer was thus polymerized at 0° C. for further 4 hours. The polymerization liquid was divided into four portions, and 122 parts [Comparative Example], 46 parts, 41 parts or 27 parts of water was separately added to each portion to thereby control the sulfuric acid concentration therein. With that, this was mixed and stirred at 60° C. for 60 minutes, and then statically left for fractional extraction.

Next, this was processed in the same manner as in Example 1, and the properties of the thus-obtained polytetramethylene ether glycol are shown in Table 3 below as Comparative Example 1 and Examples 5, 6 and 7.

Examples 8 and 9 and Comparative Example 2

The same apparatus as in Examples 5 to 7 was used. 50 parts of fluorosulfonic acid was added to 500 parts of tetrahydrofuran kept at 30° C., over a period of 1 hour, and then polymerized for further 10 hours. The polymerization liquid was divided into three portions, and 117 parts [Comparative Example], 40 parts or 27 parts of water was separately added to each portion to thereby decompose fluorosulfonic acid therein, and the concentration of the resulting sulfuric acid was thereby controlled. With that, each portion was subjected to fractional extraction at 80° C. for 90 minutes, and then this was processed in the same manner as in Example 1. The properties of the thus-obtained polytetramethylene glycol ether are shown in Table 3 below as Comparative Example 2 and Examples 8 and 9.

Example 10 and Comparative Example 3

300 parts of tetrahydrofuran and 100 parts of 3-methyltetrahydrofuran were put into the same apparatus as in Examples 5 to 7, and 4.0 parts of antimony pentachloride was added thereto with cooling at 0° C. Then, 50 parts of 30% fuming sulfuric acid was added thereto over a period of 2 hours, and the monomers were thus polymerized at 0° C. for further 4 hours. The polymerization liquid was divided into two portions, and 164 parts [Comparative Example] or 26.7 parts of water was separately added to each portion to thereby control the sulfuric acid concentration therein. With that, this was mixed and stirred at 60° C. for 60 minutes, and then statically left for fractional extraction. Next, this was processed in the same manner as in Example 1, and the properties of the thus-obtained copolyether glycol are shown in Table 3 below as Comparative Example 3 and Example 10.

TABLE 3

| | Sulfuric Acid Concentration for Fractional Extraction | Yield (%) | OH Value (mg KOH/g) | PTMG Average molecular weight | 40° C. Bulk Viscosity (poise) | Molecular Weight Distribution (Mvis/Mn) |
|---|---|---|---|---|---|---|
| 1) tetrahydrofuran/fuming sulfuric acid/$SbCl_5$ | | | | | | |
| Comparative Example 1 | 14 | 68 | 78.5 | 940 | 2.82 | 2.06 |
| Example 5 | 30 | 64 | 71.5 | 1037 | 2.90 | 1.89 |
| Example 6 | 40 | 62 | 70.4 | 1157 | 3.23 | 1.79 |
| Example 7 | 50 | 58 | 68.0 | 1329 | 3.70 | 1.66 |
| 2) tetrahydrofuran/fluorosulfonic acid | | | | | | |
| Comparative Example 2 | 14 | 64 | 115.0 | 984 | 3.01 | 2.03 |
| Example 8 | 30 | 58 | 109.1 | 1029 | 2.77 | 1.86 |
| Example 9 | 40 | 51 | 94.8 | 1183 | 3.24 | 1.75 |
| 3) tetrahydrofuran 3-methyltetrahydrofuran/fuming sulfuric acid/$SbCl_5$ | | | | | | |
| Comparative Example 3 | 14 | 60 | 36.1 | 3100 | 41.5 | 2.35 |
| Example 10 | 50 | 54 | 26.9 | 4160 | 51.7 | 1.95 |

Example 11

The aqueous sulfuric acid layer separated by the same extraction operation as in Example 4 was neutralized with calcium hydroxide and tetrahydrofuran was evaporated away.

100 parts of toluene was added thereto and subjected to azeotropic dehydration. This was filtered with a filtration aid, and toluene was evaporated away under reduced pressure from the filtrate to obtain the intended polytetramethylene glycol [hydroxyl value=6.2 mg KOH/g; number-average molecular weight=505; yield=6.2%]. The yield is a value in comparison with the polytetramethylene ether glycol charged at the beginning in Example 4. As shown in this Example, the low-molecular weight fraction dissolved in the sulfuric acid-containing aqueous layer separated by the fractional operation can be obtained as a low-molecular weight polyether-polyol by adding further water and/or alkali substance to the sulfuric acid-containing aqueous layer and repeatedly carrying out the fractional extraction operation, followed by recovering and purifying it.

According to the method of the present invention for the molecular weight distribution control of polyether-polyol, it is possible to industrially advantageously control the molecular weight distribution of polyether-polyol containing tetrahydrofuran units which is produced through polymerization of tetrahydrofuran or copolymerization of tetrahydrofuran with any other cyclic ether.

While the invention has been described in detail and with reference to specific examples thereof, it will be apparent to one skilled in the art that various changes and modifications can be made therein without departing from the spirit and scope thereof.

What is claimed is:

1. A method for producing a polyether-polyol having a molecular weight distribution ranging from 1.66 to 1.95, which comprises
preparing a polyether-polyol (A) having a number-average molecular weight of from 500 to 4500 represented by:

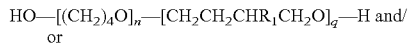

or

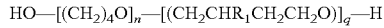

wherein
$R_1$ represents a methyl radical;
n indicates a positive integer; and
q indicates 0 or a positive integer,
by polymerization of tetrahydrofuran or copolymerization of tetrahydrofuran with methyl-substituted tetrahydrofuran, and
subjecting said polyether-polyol (A) to fractional extraction of said polyether-polyol (A) having a number-average molecular weight of from 500 to 4500 in the presence of an aqueous solution (C) containing from 30 to 50 wt % sulfuric acid based on the aqueous solution (C) at a room temperature to 100° C.

2. The method according to claim 1, wherein the fractional extraction is conducted in the presence of a fractional extraction solvent (B) which dissolves the polyether-polyol (A).

3. The method according to claim 2, wherein the fractional extraction solvent (B) is tetrahydrofuran or methyl-substituted tetrahydrofuran or a mixture thereof.

4. The method according to claim 2, wherein the amount of the fractional extraction solvent (B) is 0.2 to 4.0 in terms of the ratio by weight to the polyether-polyol (A).

5. The method according to claim 2, wherein the fractional extraction temperature ranges from room temperature to the boiling point of the fractional extraction solvent (B).

6. The method according to claim 5, wherein the fractional extraction temperature is the boiling point of the fractional extraction solvent (B).

7. The method according to claim 1, wherein the selective fractional extraction is conducted by the use of the unreacted monomer of tetrahydrofuran or methyl-substituted tetrahydrofuran still remaining in the reaction mixture after polymerization or copolymerization, directly for the selective fractional extraction solvent.

8. The method according to claim 1, wherein a catalyst containing sulfuric acid or a sulfuric acid derivative is used for cationic polymerization and said sulfuric acid that is formed from said catalyst through degradation thereof with water added for polymerization termination is directly used for the sulfuric acid-containing aqueous solution for the fractional extraction treatment.

9. The method according to claim 8, wherein the catalyst contains one or more sulfuric acid compound or derivative thereof selected from the group consisting of fluorosulfonic acid, chlorosulfonic acid and fuming sulfuric acid.

10. The method according to claim 8, wherein the fractional extraction is conducted in a reaction tank used for the synthesis of the polyether-polyol (A) or a separatory tank used for the recovery of the aqueous sulfuric acid solution after the synthesis of the polyether-polyol (A).

11. The method according to claim 1, which further comprises adding water and/or an alkali substance to an aqueous sulfuric acid solution (D) obtained after the fractional extraction by the use of an aqueous solution (C) containing sulfuric acid to thereby reduce the sulfuric acid concentration of the aqueous sulfuric acid solution (D), recovering a polyether-polyol by conducting fractional extraction in the aqueous sulfuric acid solution (D) at a room temperature to 100° C.

12. The method according to claim 11, wherein said recovering is conducted in the presence of a fractional extraction solvent (B) which dissolves the polyether-polyol.

13. The method according to claim 11, wherein the fractional extraction solvent (B) is tetrahydrofuran or methyl-substituted tetrahydrofuran or a mixture thereof.

14. The method according to claim 1 further comprising heating and distilling the sulfuric acid-containing aqueous layer after the fractional extraction treatment to depolymerize the products contained therein into monomer units, and evaporating and recovering the resulting monomer units along with the unreacted monomer dissolved in the sulfuric acid-containing aqueous layer.

15. The method according to claim 3, wherein the amount of the fractional extraction solvent (B) is 0.2 to 4.0 in terms of the ratio by weight to the polyether-polyol (A).

16. The method according to claim 9, wherein the fractional extraction is conducted in a reaction tank used for the synthesis of the polyether-polyol (A) or a separatory tank used for the recovery of the aqueous sulfuric acid solution after the synthesis of the polyether-polyol (A).

17. The method according to claim 11, further comprising heating and distilling the sulfuric acid-containing aqueous layer after the fractional extraction treatment to depolymerize the products contained therein into monomer units, and evaporating and recovering the resulting monomer units along with the unreacted monomer dissolved in the sulfuric acid-containing aqueous layer.

* * * * *